United States Patent
Yu et al.

(10) Patent No.: US 8,379,691 B2
(45) Date of Patent: Feb. 19, 2013

(54) METHOD AND APPARATUS FOR ESTIMATING CHANNEL IN MOBILE COMMUNICATION NETWORK

(75) Inventors: Chang Wahn Yu, Daejeon (KR); Kyung Yeol Sohn, Daejeon (KR); Hyuk Jun Oh, Seoul (KR); Youn Ok Park, Daejeon (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 1024 days.

(21) Appl. No.: 12/212,433

(22) Filed: Sep. 17, 2008

(65) Prior Publication Data

US 2009/0154540 A1 Jun. 18, 2009

(30) Foreign Application Priority Data

Dec. 12, 2007 (KR) .................. 10-2007-0129418

(51) Int. Cl.
*H04B 1/00* (2006.01)
*H04L 27/28* (2006.01)
*H04J 11/00* (2006.01)

(52) U.S. Cl. .................. 375/146; 375/260; 370/208
(58) Field of Classification Search .................. None
See application file for complete search history.

(56) References Cited

U.S. PATENT DOCUMENTS

| | | | | | |
|---|---|---|---|---|---|
| 5,568,625 | A | * | 10/1996 | Lee ................................. | 711/4 |
| 5,706,057 | A | * | 1/1998 | Strolle et al. ............. | 375/240.01 |
| 5,724,600 | A | * | 3/1998 | Ogi ................................ | 712/11 |
| 5,760,741 | A | * | 6/1998 | Huynh et al. .................. | 342/373 |
| 6,229,792 | B1 | * | 5/2001 | Anderson et al. ............. | 370/280 |
| 2004/0086027 | A1 | * | 5/2004 | Shattil ........................... | 375/146 |
| 2005/0094550 | A1 | * | 5/2005 | Huh et al. ...................... | 370/203 |
| 2006/0246916 | A1 | * | 11/2006 | Cheng et al. .................. | 455/450 |
| 2007/0049199 | A1 | * | 3/2007 | Lim et al. ..................... | 455/63.1 |
| 2007/0165514 | A1 | * | 7/2007 | Akita ............................ | 370/208 |
| 2007/0189149 | A1 | * | 8/2007 | Terabe ........................... | 370/208 |
| 2008/0039107 | A1 | * | 2/2008 | Ma et al. ....................... | 455/450 |
| 2008/0062953 | A1 | * | 3/2008 | Li et al. ......................... | 370/343 |

FOREIGN PATENT DOCUMENTS

| | | |
|---|---|---|
| KR | 10-2003-0060997 A | 7/2003 |
| KR | 10-2004-0004462 A | 1/2004 |
| KR | 10-2006-0122972 A | 11/2006 |
| KR | 10-2007-0024310 A | 3/2007 |
| KR | 1020070098067 A | 10/2007 |
| WO | 02/49305 A2 | 6/2002 |
| WO | 02/49306 A2 | 6/2002 |
| WO | 02/49385 A2 | 6/2002 |
| WO | WO2006000091 * | 1/2006 |

\* cited by examiner

*Primary Examiner* — David C. Payne
*Assistant Examiner* — Sarah Hassan
(74) *Attorney, Agent, or Firm* — Jefferson IP Law, LLP

(57) ABSTRACT

The present invention relates to a method and apparatus for estimating a channel in a mobile communication network. In particular, the present invention relates to a method of estimating a channel under a channel environment where interference between neighboring base stations exists in a mobile communication network using an orthogonal frequency division multiplexing (OFDM) method. In order to estimate a channel, one cluster is divided into two sub-clusters, and pilot sub-carrier signals included in at least one sub-cluster in an OFDM symbol direction are used. Therefore, it is possible to further improve performance as compared to a method of estimating a channel by using pilot sub-carriers included in one cluster.

8 Claims, 6 Drawing Sheets

METHOD AND APPARATUS FOR ESTIMATING CHANNEL IN MOBILE COMMUNICATION NETWORK

CROSS-REFERENCE TO RELATED APPLICATION

This application claims priority to and the benefit of Korean Patent Application No. 10-2007-0129418 filed in the Korean Intellectual Property Office on Dec. 12, 2007, the entire contents of which are incorporated herein by reference.

BACKGROUND OF THE INVENTION (a) Field of the Invention

The present invention relates to a method and apparatus for estimating a channel in a mobile communication network. More particularly, the present invention relates to a method and apparatus for a channel under a channel environment where interference between neighboring base stations exists in a mobile communication network using an orthogonal frequency division multiplexing (hereinafter referred to as "OFDM") method.

(b) Description of the Related Art

The OFDM method is a method of converting input serial symbol streams into parallel signals, modulating the parallel signals with a plurality of sub-carriers having orthogonality with respect to one another, and transmitting the modulated signals.

A partial usage sub-channel (PUSC) area transmitted from a base station of an OFDM system to a terminal is composed of a plurality of clusters. One cluster is composed of fourteen sub-carriers and two symbols.

FIG. 1 is a view illustrating the structure of one cluster according to the related art.

As shown in FIG. 1, one cluster is composed of twenty-four data sub-carriers and four pilot sub-carriers to be used to estimate a channel.

FIG. 2 is a view illustrating that channels of signals received from two base stations are estimated in the OFDM system according to the related art. In other words, FIG. 2 shows that channels are estimated using one cluster having the structure shown in FIG. 1.

As shown in FIG. 2, two pilot sub-carrier signals received from a terminal MS with respect to pilot sub-carrier signals included in PUSC clusters transmitted from a first base station BS 1 and a second base station BS 2 are expressed as in the following Equation 1.

$$\vec{y} = \begin{bmatrix} Y_1 \\ Y_2 \end{bmatrix} = P \cdot \vec{h} + \vec{n} = \begin{bmatrix} p_{11} & p_{12} \\ p_{21} & p_{22} \end{bmatrix} \cdot \begin{bmatrix} h_1 \\ h_2 \end{bmatrix} + \begin{bmatrix} n_1 \\ n_2 \end{bmatrix} \quad \text{(Equation 1)}$$

Here, $Y_i$ represents signals received by the terminal, $P_{ij}$ represents the i-th pilot sub-carrier signal transmitted from the j-th base station, $h_i$ represents a wireless path gain that a signal transmitted from the i-th base station undergoes, and $n_i$ represents white noise added to the i-th received signal.

If a maximum likelihood channel estimating method that is easily implemented with respect to the received signals of Equation 1 and provides excellent performance is used, Equation 2 is given as follows.

$$\vec{h}_{ML} = (P^H \cdot P)^{-1} \cdot P^H \cdot \vec{y} \quad \text{(Equation 2)}$$

Here, $P^H$ represents the Hermitian matrix of a matrix P, $(\ )^{-1}$ represents the inversion of a matrix, and $(P^H \cdot P)^{-1}$ should exist for this method.

Further, a pilot sub-carrier used to estimate a channel is modulated to "1" or "−1" and transmitted. Therefore, a probability that the inversions of the matrixes of Equation 2 used to estimate channels do not exist may become very strong.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and apparatus for estimating a channel in a mobile communication network having advantages of improving the performance of channel estimation under a channel environment where interference between neighboring base stations exists.

An exemplary embodiment of the present invention provides a method of estimating a channel under a channel environment where interference between neighboring base stations exists. The method includes dividing at least one partial usage sub-channel cluster, which is composed of data sub-carrier signals and pilot sub-carrier signals, into two sub-clusters; forming each of the divided sub-clusters and at least one sub-cluster divided from a neighboring partial usage sub-channel cluster in a symbol direction, as a channel estimation group; and estimating a channel by using the pilot sub-carrier signals included in the formed channel estimation group.

Another embodiment of the present invention provides an apparatus for estimating a channel under a channel environment where interference between neighboring base stations exists. The apparatus includes a channel estimation group generator and a channel estimator. The channel estimation group generator divides at least one partial usage sub-channel cluster, which is composed of data sub-carrier signals and pilot sub-carrier signals, into two sub-clusters, and forms each of the divided sub-clusters and at least one sub-cluster divided from a neighboring partial usage sub-channel cluster in a symbol direction, as a channel estimation group. The channel estimator estimates a channel by using the pilot sub-carrier signals included in the channel estimation group.

According to the present invention, in order to estimate a channel, one cluster is divided into two sub-clusters and pilot sub-carrier signals included in at least one sub-cluster in an OFDM symbol direction are used to estimate channels. Therefore, it is possible to further improve performance as compared to a method of estimating a channel by using pilot sub-carriers included in one cluster.

DETAILED DESCRIPTION OF THE EMBODIMENTS

Figure 1:
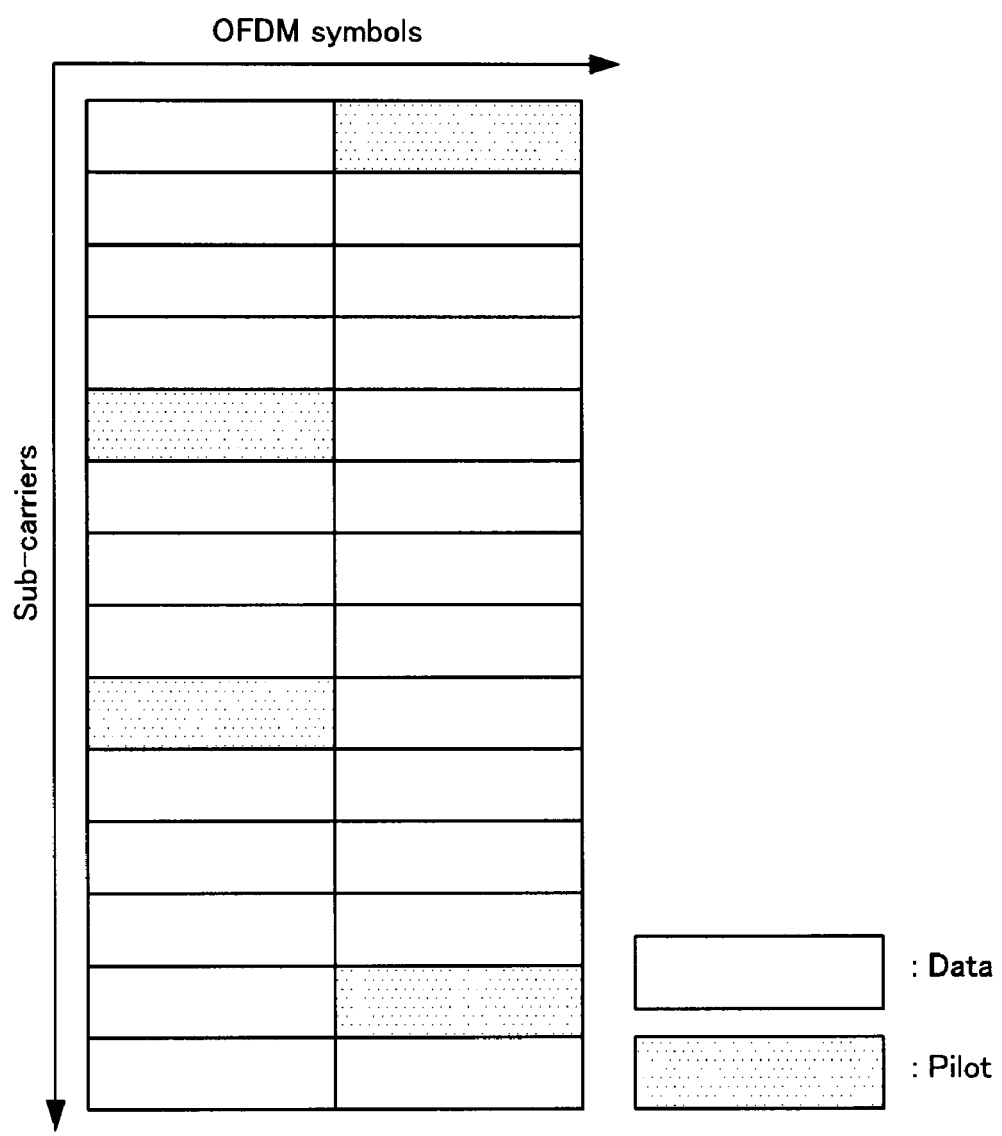
FIG. 1 is a view illustrating the structure of one cluster according to the related art.
Figure 2:
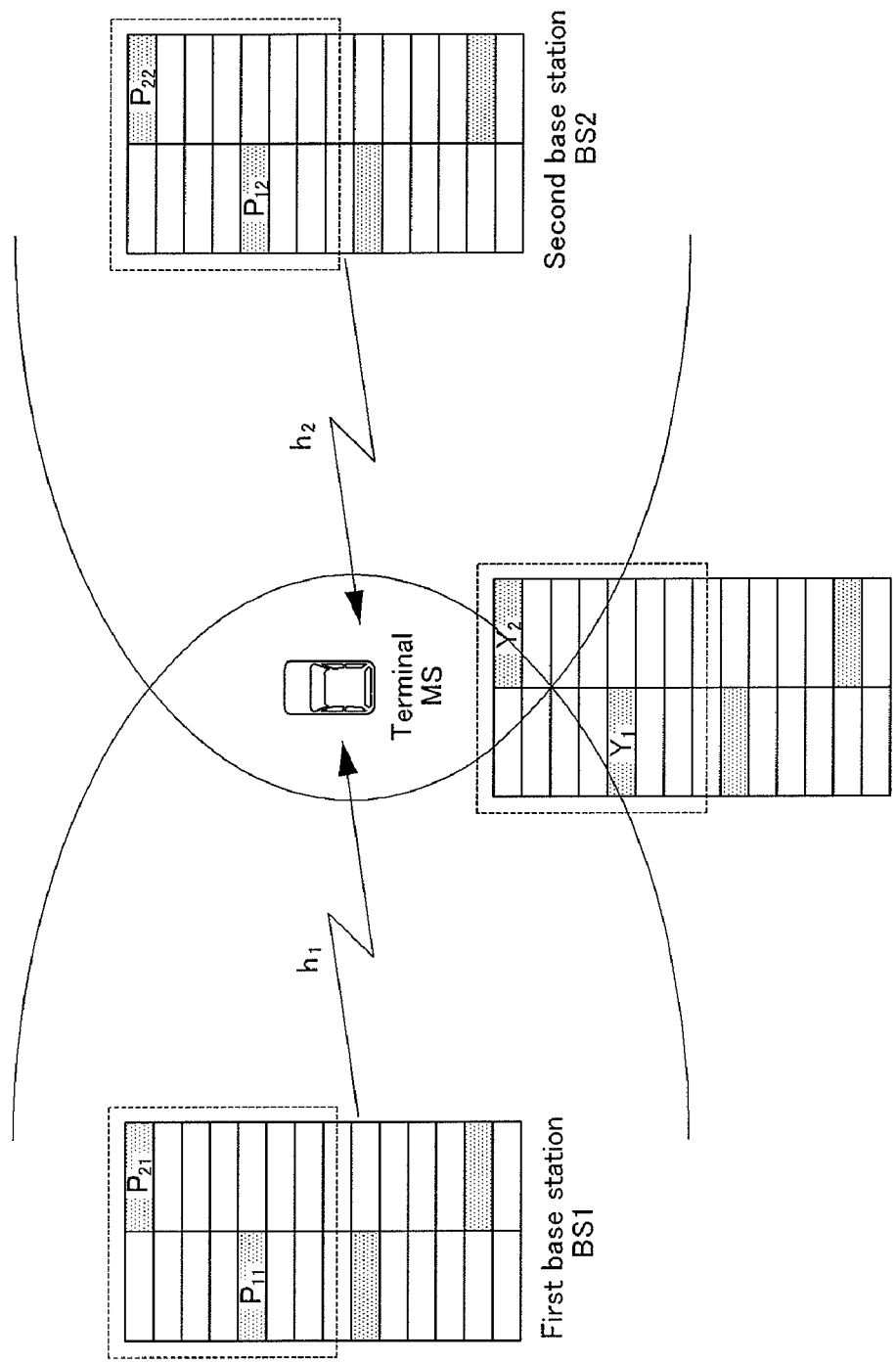
FIG. 2 is a view illustrating that channels of signals received from two base stations are estimated in an OFDM system according to the related art.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

It will be further understood that the terms "comprise" and/or "comprising", when used in this specification, specify the presence of stated features, integers, steps, operations, elements, and/or components, but do not preclude the presence or addition of one or more other features, integers, steps, operations, elements, components, and/or groups thereof.

In addition, the terms "-er", "-or", and "module" described in the specification mean units for processing at least one function and operation, and can be implemented by hardware components or software components, and combinations thereof.

In this specification, a mobile station (MS) may designate a terminal, a mobile terminal (MT), a subscriber station (SS), a portable subscriber station (PSS), user equipment (UE), an access terminal (AT), etc., and may include functions of all or a part of a terminal, a mobile terminal, a subscriber station, a portable subscriber station, user equipment, an access terminal, etc.

In this specification, a base station (BS) may represent an access point (AP), a radio access station (RAS), a node B, a base transceiver station (BTS), a mobile multihop relay (MMR)-BS, and the like. Further, the base station may have all or partial functions of the access point, the radio access station, the node B, the base transceiver station, the MMR-BS, and the like.

Figure 3:
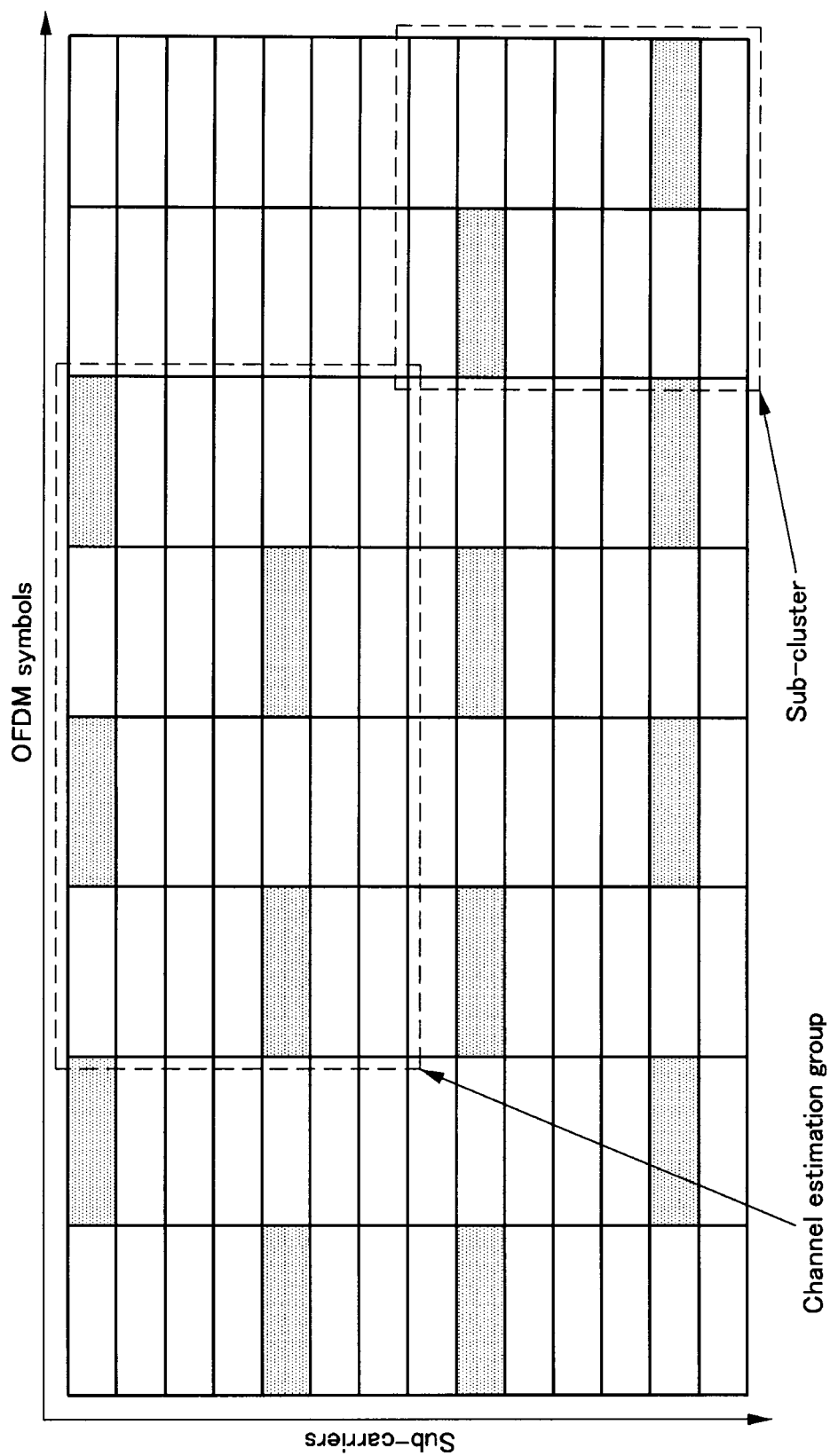
FIG. 3 is a view illustrating the structure of a cluster according to an exemplary embodiment of the present invention.

FIG. 3 is a view illustrating the structure of a cluster according to an exemplary embodiment of the present invention.

As shown in FIG. 3, one partial usage sub-channel (hereinafter referred to as "PUSC") cluster is divided into two sub-clusters. In this case, a cluster is divided into two sub-clusters that are small units each composed of twelve data sub-carriers and two pilot sub-carrier signals in OFDM symbols. Each of the divided sub-clusters forms a channel estimation group together with a sub-cluster of a neighboring cluster in an OFDM symbol direction, and is used to estimate a channel.

In this case, it is assumed that a channel does not vary for each channel estimation group unit used to estimate a channel.

Therefore, a method of applying channel estimation results obtained by a channel estimation group using OFDM symbols 1 to 4 to OFDM symbols 1 and 2, and applying channel estimation results obtained by using OFDM symbols 3 to 6 to OFDM symbols 3 and 4, is used.

Figure 4:
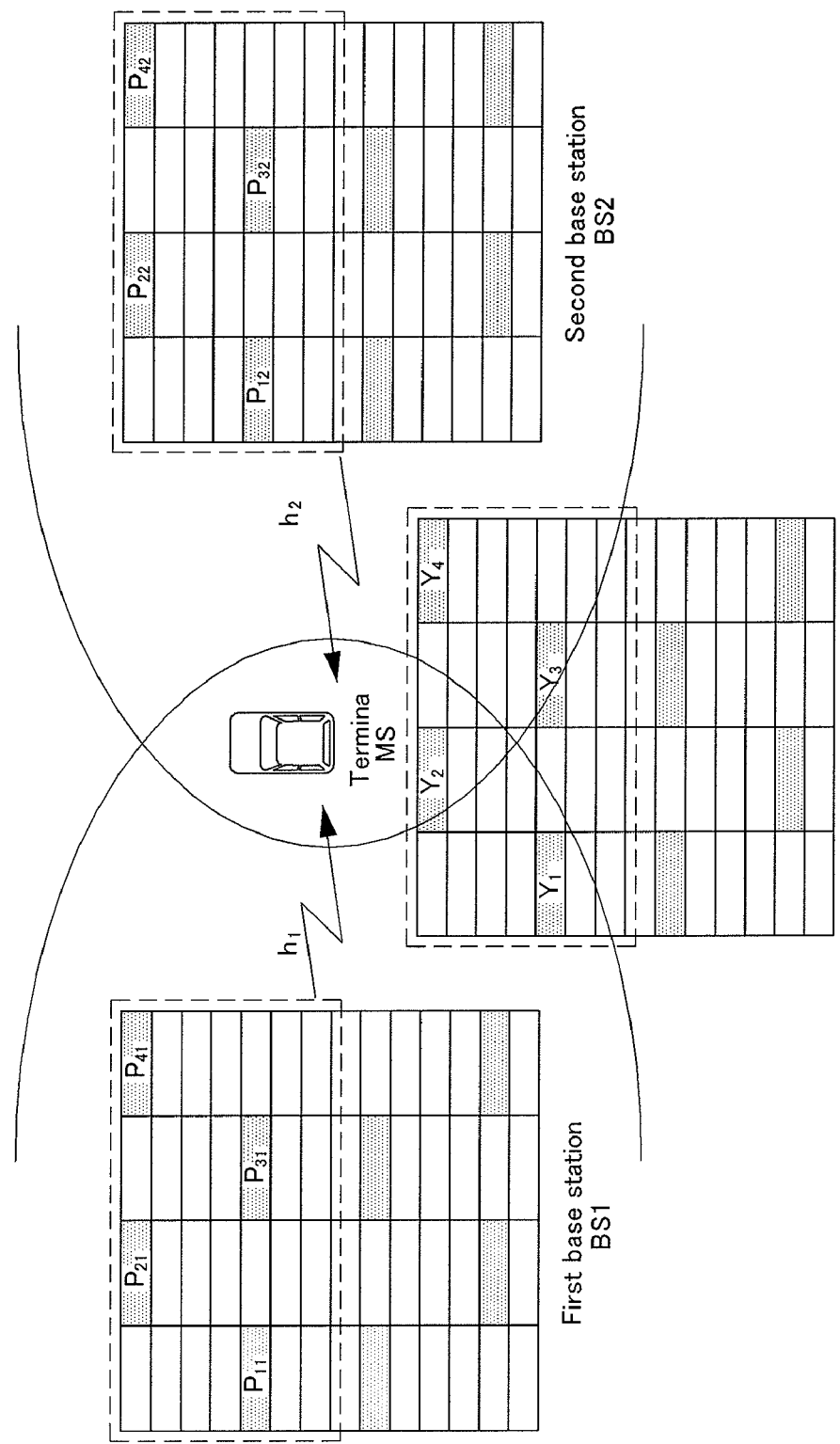
FIG. 4 is a view illustrating that channels of signals received from two base stations are estimated in an OFDM system according to an exemplary embodiment of the present invention.
Figure 5:
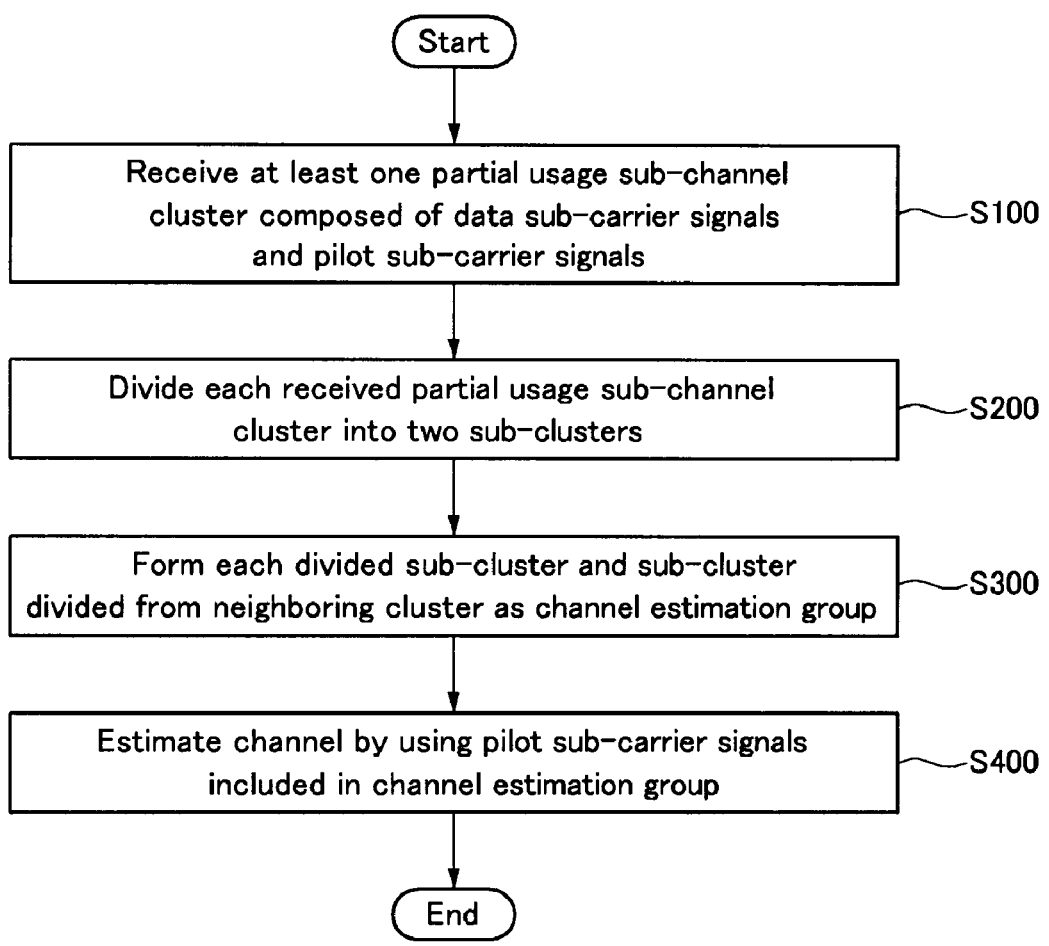
FIG. 5 is a flowchart illustrating a method of estimating a channel according to an exemplary embodiment of the present invention.

FIG. 4 is a view illustrating that channels of signals received from two base stations are estimated in an OFDM system according to an exemplary embodiment of the present invention. FIG. 5 is a flowchart illustrating a method of estimating a channel according to an exemplary embodiment of the present invention.

As shown in FIG. 4 and FIG. 5, one cluster, which is composed of data sub-carrier signals and pilot signals transmitted from a first base station and a second base station (S100), is divided into two sub-clusters (S200). The signals transmitted from the first base station and the second base station form a channel estimation group (S300) which is expressed as in the following Equation 3.

$$\vec{y} = \begin{bmatrix} Y_1 \\ Y_2 \\ Y_3 \\ Y_4 \end{bmatrix} = P \cdot \vec{h} + \vec{n} = \begin{bmatrix} p_{11} & p_{12} \\ p_{21} & p_{22} \\ p_{31} & p_{32} \\ p_{41} & p_{42} \end{bmatrix} \cdot \begin{bmatrix} h_1 \\ h_2 \end{bmatrix} + \begin{bmatrix} n_1 \\ n_2 \\ n_3 \\ n_4 \end{bmatrix} \quad \text{(Equation 3)}$$

Here, $Y_i$ represents signals received by a terminal.

$P_{ij}$ is the i-th pilot sub-carrier signal transmitted from the j-th base station.

$h_i$ represents a wireless path gain that a signal transmitted from the i-th base station undergoes, and $n_i$ represents white noise added to the i-th received signal.

Then, the pilot sub-carrier signals included in the channel estimation group formed in S300 are used to estimate channels (S400). In other words, the resulting value of maximum likelihood channel estimation with respect to Equation 3 can be obtained from the following Equation 4.

$$\vec{h}_{ML} = (P^H \cdot P)^+ \cdot P^H \cdot \vec{y} \quad \text{(Equation 4)}$$

Here, $(P^H \cdot P)^+$ represents the pseudo-inversion of a matrix $(P^H \cdot P)$.

$P^H$ represents the Hermitian matrix of a matrix P, and $(P^H \cdot P)^{-1}$ represents the inversion of a matrix $(P^H \cdot P)$. In order to use such a method, $(P^H \cdot P)^{-1}$ should exist.

Figure 6:
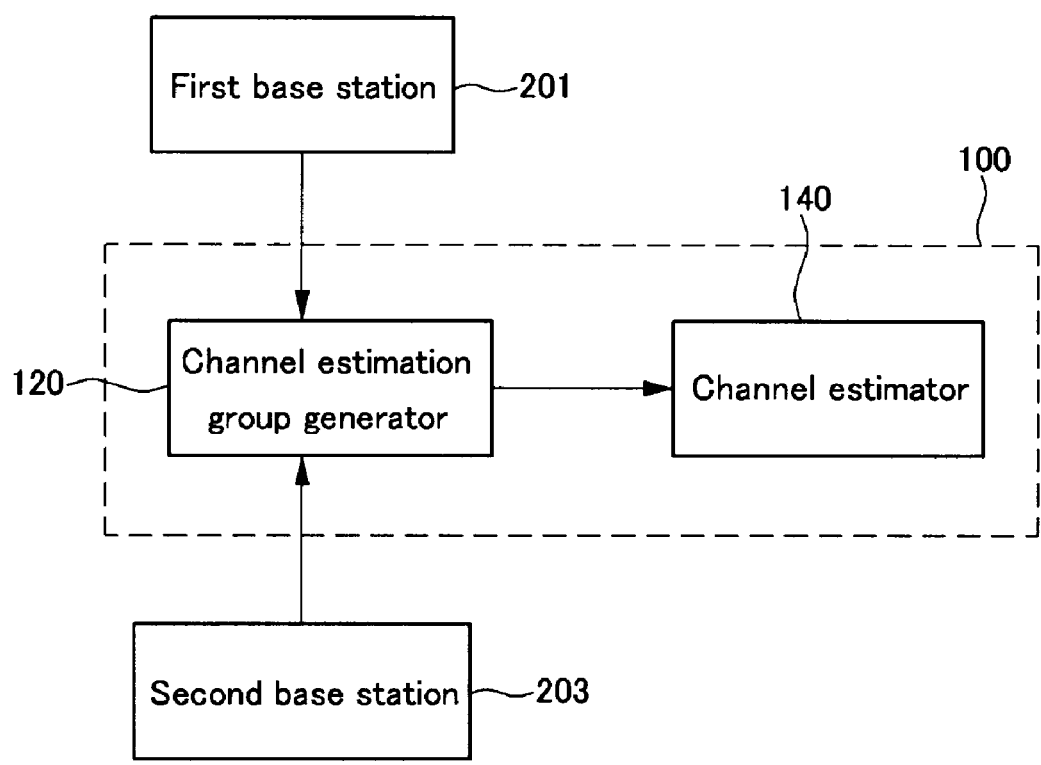
FIG. 6 is a block diagram illustrating the configuration of an apparatus for estimating a channel according to an exemplary embodiment of the present invention.

FIG. 6 is a block diagram illustrating the configuration of an apparatus for estimating a channel according to an exemplary embodiment of the present invention.

As shown in FIG. 6, an apparatus 100 for estimating a channel is installed in a terminal and estimates channels of signals transmitted from a first base station and a second base station.

The apparatus 100 for estimating a channel includes a channel estimation group generator 120 and a channel estimator 140.

The channel estimation group generator 120 divides at least one PUSC cluster, which is composed of data sub-carrier signals and pilot sub-carrier signals, into two sub-clusters. Each of the sub-clusters forms a channel estimation group that is composed of at least one sub-cluster divided from a neighboring PUSC cluster in the symbol direction. In other words, the pilot sub-carrier signals included in at least one sub-cluster in the OFDM symbol direction are used to form a matrix.

The channel estimator 140 uses the pilot sub-carrier signals included in the channel estimation group to estimate channels. In other words, the pseudo-inversion of the matrix formed by the channel estimation group generator 120 is used to estimate a channel.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of estimating a channel under a channel environment where interference between neighboring base stations exists, the method comprising:
   dividing at least one partial usage sub-channel cluster, which is composed of data sub-carrier signals and pilot sub-carrier signals, into two sub-clusters, each of the sub-clusters including at least one data sub-carrier signal and at least one pilot sub-carrier;
   forming each of the divided sub-clusters and at least one sub-cluster divided from a neighboring partial usage sub-channel cluster in a symbol direction, as a channel estimation group; and
   estimating a channel by using the pilot sub-carrier signals included in the formed channel estimation group,
   wherein in the forming the sub-clusters as a channel estimation group, a channel estimation group for which a channel does not vary during channel estimation is formed.

2. The method of claim 1, wherein in the dividing of the partial usage sub-channel cluster, at least one partial usage sub-channel cluster is divided into sub-clusters that are composed of twelve data sub-carrier signals and two pilot sub-carrier signals in two symbols.

3. The method of claim 1, wherein the forming the sub-clusters as a channel estimation group forms an equation including a determinant, which is composed of pilot sub-carrier signals included in the sub-clusters divided from the cluster received from a first base station and pilot sub-carrier signals included in the sub-clusters divided from the cluster received from a neighboring second base station, a determinant regarding wireless path gains that the signals transmitted from the first base station and the second base station undergo, and white noise of signals transmitted from the first base station and the second base station.

4. The method of claim 3, wherein the estimating a channel comprises:
   forming a matrix on the basis of a pilot matrix, which is composed of the pilot sub-carrier signals included in each sub-cluster from the first base station and the second base station, and the Hermitian matrix of the pilot matrix; and
   estimating a channel by using a pseudo-inversion of the matrix.

5. An apparatus for estimating a channel under channel environment where interference between neighboring base stations exists, the apparatus comprising:
   a channel estimation group generator dividing at least one partial usage sub-channel cluster, which is composed of data sub-carrier signals and pilot sub-carrier signals, into two sub-clusters, each of the sub-clusters including at least one data sub-carrier signal and at least one pilot sub-carrier, and forming each of the divided sub-clusters and at least one sub-cluster divided from a neighboring partial usage sub-channel cluster in a symbol direction, as a channel estimation group; and
   a channel estimator estimating a channel by using the pilot sub-carrier signals included in the channel estimation group,
   wherein the channel estimation group generator forms each channel estimation group for which a channel does not vary during channel estimation.

6. The apparatus of claim 5, wherein the channel estimation group generator divides at least one partial usage sub-channel cluster into sub-clusters that are composed of twelve data sub-carrier signals and two pilot sub-carrier signals in two symbols.

7. The apparatus of claim 5, wherein the channel estimation group generator forms an equation including a determinant, which is composed of pilot sub-carrier signals included in the sub-clusters divided from the cluster received from a first base station and pilot sub-carrier signals included in the sub-clusters divided from the cluster received from a neighboring second base station, a determinant regarding wireless path gains that the signals transmitted from the first base station and the second base station undergo, and white noise with respect to signals transmitted from the first base station and the second base station.

8. The apparatus of claim 7, wherein the channel estimator forms a matrix on the basis of a pilot matrix, which is composed of the pilot sub-carrier signals included in each sub-cluster from the first base station and the second base station and the Hermitian matrix of the pilot matrix, and estimates a channel by using a pseudo-inversion of the matrix.

* * * * *